United States Patent
Bunker (10) Patent No.: US 10,704,395 B2
(45) Date of Patent: Jul. 7, 2020

(54) AIRFOIL WITH COOLING CIRCUIT

(71) Applicant: General Electric Company, Schenectady, NY (US)

(72) Inventor: Ronald Scott Bunker, West Chester, OH (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 15/150,659

(22) Filed: May 10, 2016

(65) Prior Publication Data

US 2017/0328210 A1    Nov. 16, 2017

(51) Int. Cl.
    *F01D 5/28*    (2006.01)
    *F01D 5/18*    (2006.01)

(52) U.S. Cl.
    CPC .............. *F01D 5/186* (2013.01); *F01D 5/288* (2013.01); *F05D 2260/204* (2013.01); *F05D 2260/205* (2013.01); *Y02T 50/676* (2013.01)

(58) Field of Classification Search
    CPC .... F01D 5/186; F01D 5/288; F05D 2220/323; F05D 2260/202; F05D 2300/611
    See application file for complete search history.

(56) References Cited

U.S. PATENT DOCUMENTS

| | | | |
|---|---|---|---|
| 3,698,834 A * | 10/1972 | Meginnis | F01D 5/184 416/96 R |
| 5,363,645 A | 11/1994 | Pellet | |
| 5,383,766 A * | 1/1995 | Przirembel | F01D 5/186 416/92 |
| 5,405,242 A | 4/1995 | Auxier et al. | |
| 5,626,462 A | 5/1997 | Jackson et al. | |
| 6,254,334 B1 * | 7/2001 | LaFleur | F01D 5/186 415/115 |
| 6,261,054 B1 | 7/2001 | Bunker et al. | |
| 6,280,140 B1 | 8/2001 | Soecting et al. | |
| 6,375,425 B1 | 4/2002 | Lee et al. | |
| 6,379,118 B2 * | 4/2002 | Lutum | F01D 5/186 416/97 R |
| 6,443,700 B1 | 9/2002 | Grylls et al. | |
| 6,461,107 B1 | 10/2002 | Lee et al. | |
| 6,499,949 B2 | 12/2002 | Schafrik et al. | |
| 6,511,762 B1 | 1/2003 | Lee et al. | |
| 6,554,563 B2 | 4/2003 | Noe et al. | |
| 6,582,194 B1 | 6/2003 | Birkner et al. | |
| 6,769,866 B1 * | 8/2004 | Kannefass | F01D 5/147 415/115 |
| 6,905,302 B2 | 6/2005 | Lee et al. | |

(Continued)

FOREIGN PATENT DOCUMENTS

EP    2 653 655 A2    10/2013

OTHER PUBLICATIONS

International Search Report and Written Opinion issued in connection with corresponding PCT Application No. PCT/US2017/025717 dated Mar. 14, 2018.

*Primary Examiner* — Moshe Wilensky
*Assistant Examiner* — Theodore C Ribadeneyra
(74) *Attorney, Agent, or Firm* — McGarry Bair PC (57) ABSTRACT

An airfoil for a turbine engine having an engine component including an air supply circuit coupled to a plurality of passages within the outer wall of the engine component where cooling air moves from the air supply circuit to an outer surface of the engine component through the passages.

15 Claims, 7 Drawing Sheets

(56) References Cited

U.S. PATENT DOCUMENTS

| | | | |
|---|---|---|---|
| 6,932,571 B2 | 8/2005 | Cunha et al. | |
| 7,097,425 B2 | 8/2006 | Cunha et al. | |
| 7,311,498 B2 | 12/2007 | Cunha et al. | |
| 7,488,156 B2* | 2/2009 | Liang | F01D 5/186 |
| | | | 416/96 R |
| 7,513,744 B2 | 4/2009 | Cunha et al. | |
| 7,553,131 B2 | 6/2009 | Cunha et al. | |
| 7,625,180 B1* | 12/2009 | Liang | F01D 5/186 |
| | | | 29/889.2 |
| 7,717,677 B1 | 5/2010 | Liang | |
| 7,775,768 B2 | 8/2010 | Devore et al. | |
| 7,866,948 B1* | 1/2011 | Liang | F01D 5/186 |
| | | | 416/97 R |
| 8,167,559 B2* | 5/2012 | Liang | F01D 5/187 |
| | | | 415/115 |
| 8,414,263 B1* | 4/2013 | Liang | F01D 5/186 |
| | | | 416/96 R |
| 8,608,430 B1* | 12/2013 | Liang | F01D 5/187 |
| | | | 415/115 |
| 9,003,657 B2 | 4/2015 | Bunker et al. | |
| 9,216,491 B2* | 12/2015 | Bunker | B24C 1/045 |
| 9,476,306 B2* | 10/2016 | Bunker | F01D 5/187 |
| 9,752,440 B2* | 9/2017 | Miranda | F01D 5/18 |
| 9,874,110 B2* | 1/2018 | Vandervaart | F01D 5/186 |
| 9,897,006 B2* | 2/2018 | Miranda | F02C 7/18 |
| 2005/0111979 A1* | 5/2005 | Liang | F01D 5/186 |
| | | | 416/97 R |
| 2007/0280832 A1* | 12/2007 | Liang | F01D 5/186 |
| | | | 416/97 R |
| 2011/0110771 A1* | 5/2011 | Morgan | F01D 5/147 |
| | | | 415/177 |
| 2011/0236178 A1* | 9/2011 | Devore | B22C 9/04 |
| | | | 415/1 |
| 2011/0259017 A1* | 10/2011 | Lacy | F01D 5/186 |
| | | | 60/806 |
| 2012/0034075 A1* | 2/2012 | Hsu | F01D 9/023 |
| | | | 415/178 |
| 2012/0124832 A1* | 5/2012 | Bunker | F01D 5/147 |
| | | | 29/888 |
| 2012/0255870 A1* | 10/2012 | Rebak | F01D 5/147 |
| | | | 205/670 |
| 2012/0276308 A1* | 11/2012 | Rebak | F01D 5/184 |
| | | | 428/34.1 |
| 2013/0086784 A1* | 4/2013 | Bunker | C23C 4/00 |
| | | | 29/402.03 |
| 2013/0294898 A1* | 11/2013 | Lee | F01D 25/12 |
| | | | 415/177 |
| 2014/0302278 A1 | 10/2014 | Bunker | |
| 2015/0034604 A1 | 2/2015 | Subramanian et al. | |
| 2015/0064019 A1 | 3/2015 | Lacy et al. | |
| 2015/0086408 A1* | 3/2015 | Kottilingam | B22F 5/04 |
| | | | 419/5 |
| 2015/0143792 A1 | 5/2015 | Bunker | |
| 2015/0184857 A1 | 7/2015 | Cunha et al. | |
| 2015/0321289 A1 | 11/2015 | Bruck et al. | |
| 2015/0369054 A1* | 12/2015 | Propheter-Hinckley | F01D 5/186 |
| | | | 165/51 |
| 2015/0377034 A1 | 12/2015 | Quitter | |
| 2016/0222794 A1* | 8/2016 | Slavens | F01D 5/187 |

* cited by examiner

AIRFOIL WITH COOLING CIRCUIT

BACKGROUND OF THE INVENTION

Turbine engines, and particularly gas or combustion turbine engines, are rotary engines that extract energy from a flow of combusted gases passing through the engine onto a multitude of rotating turbine blades. Turbine engines have been used for land and nautical locomotion and power generation, but are most commonly used for aeronautical applications such as for aircraft, including helicopters. In aircraft, turbine engines are used for propulsion of the aircraft. In terrestrial applications, turbine engines are often used for power generation.

Turbine engines for aircraft are designed to operate at high temperatures to maximize engine efficiency, so cooling of certain engine components, such as the high pressure turbine and the low pressure turbine, can be beneficial. Typically, cooling is accomplished by ducting cooler air from the high and/or low pressure compressors to the engine components that require cooling. Temperatures in the high pressure turbine are around 1000° C. to 2000° C. and the cooling air from the compressor is around 500° C. to 700° C. While the compressor air is a high temperature, it is cooler relative to the turbine air, and can be used to cool the turbine.

Contemporary turbine blades generally include one or more interior cooling circuits for routing the cooling air through the blade to cool different portions of the blade, and can include dedicated cooling circuits for cooling different portions of the blade, such as the leading edge, trailing edge and tip of the blade.

BRIEF DESCRIPTION OF THE INVENTION

An airfoil for a turbine engine, the airfoil comprising: an outer wall having an outer surface and an inner surface bounding an interior space, the outer wall defining a pressure side and a suction side extending axially between a leading edge and a trailing edge and extending radially between a root and a tip; at least one coating applied to the outer surface; at least one wall cooling passage provided within at least a portion of an interior of the outer wall; at least one skin cooling circuit comprising at least one channel formed in the outer surface and fluidly coupled to the wall cooling passage; and at least one cooling air supply circuit located within the interior and fluidly coupled to the at least one channel to define a serial air flow path from the supply circuit to the at least one channel and then to the wall cooling passage.

An engine component for a turbine engine, which generates a hot air flow, and provides a cooling fluid flow, comprising: a wall separating the hot air flow from the cooling fluid flow and having a first surface along which the hot air flows in a hot flow path and a second surface facing the cooling fluid flow; at least one coating applied to the first surface; at least one wall cooling passage provided within at least a portion of an interior of the wall; at least one skin cooling circuit comprising at least one channel formed in the first surface and fluidly coupled to the wall cooling passage; and wherein the cooling fluid flow is fluidly coupled to the at least one channel, which is fluidly coupled to the wall cooling passage to define a serial cooling air flow path from the at least one channel to the wall cooling passage.

A method of cooling an airfoil comprising passing a cooling airflow from a hollow interior of the airfoil to a channel in an outer surface of an outer wall, and then from the channel to a passage within the outer wall.

DESCRIPTION OF EMBODIMENTS OF THE INVENTION

The described embodiments of the present invention are directed to an engine component for an engine having a cooling circuit comprising skin cooling circuit, wall cooling passages, and air supply circuits wherein the skin cooling circuit is coupled with the air supply circuit and the wall cooling passage to supply cooling air first to the skin cooling circuit and then to the wall cooling passage before exiting through a skin cooling circuit. For purposes of illustration, the present invention will be described with respect to the turbine for an aircraft gas turbine engine. It will be understood, however, that the invention is not so limited and may have general applicability within an engine, including compressors, as well as in non-aircraft applications, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine or being relatively closer to the engine outlet as compared to another component.

Additionally, as used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
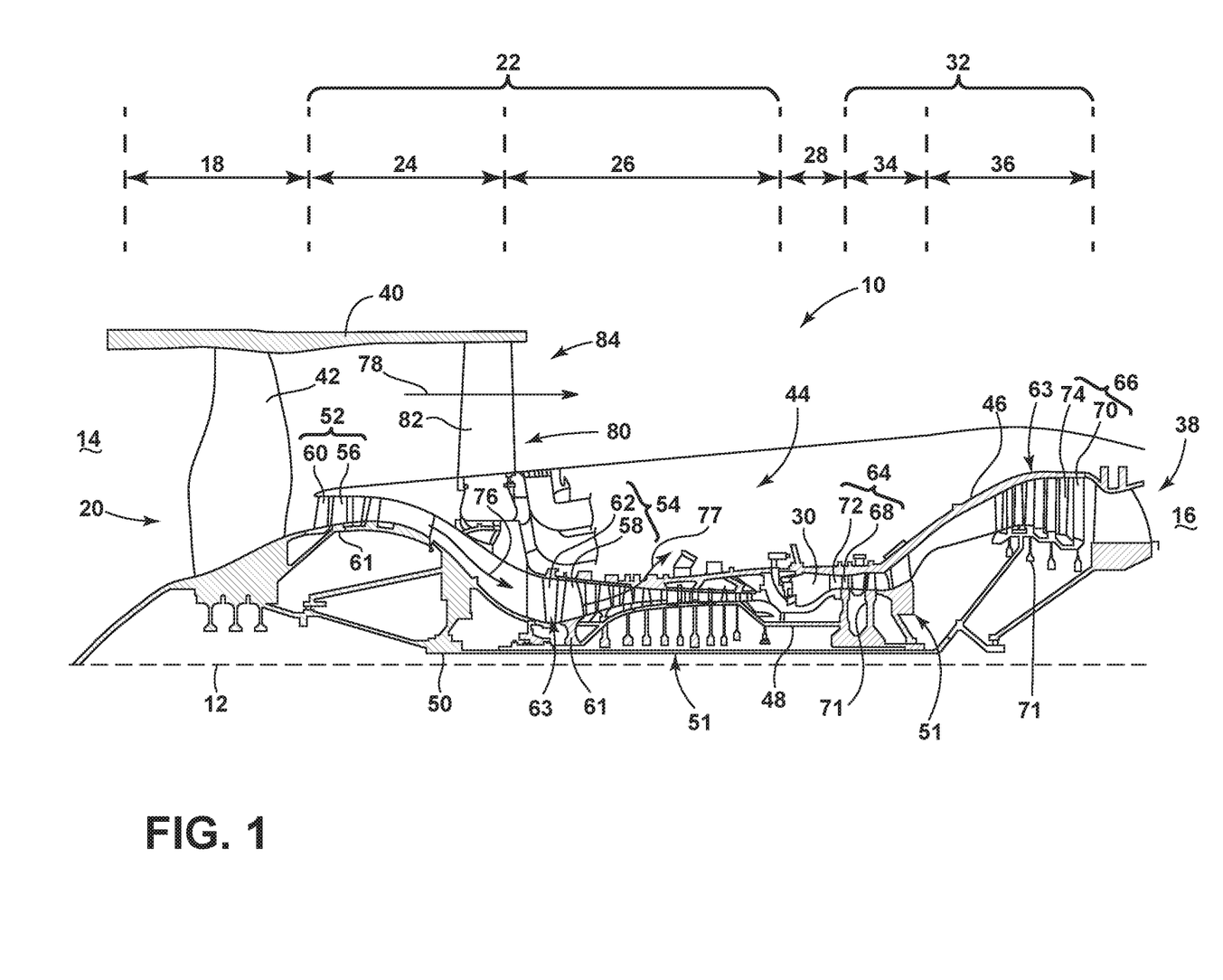
FIG. 1 is a schematic cross-sectional diagram of a turbine engine for an aircraft.

FIG. 1 is a schematic cross-sectional diagram of a turbine engine 10 for an aircraft. The engine 10 has a generally longitudinally extending axis or centerline 12 extending forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the centerline 12. The HP compressor 26, the combustor 30, and the HP turbine 34 form a core 44 of the engine 10, which generates a hot air flow. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The spools 48, 50 are rotatable about the engine centerline and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having its own disk 61. The vanes 60, 62 for a stage of the compressor can be mounted to the core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the core casing 46 in a circumferential arrangement.

Complementary to the rotor portion, the stationary portions of the engine 10, such as the static vanes 60, 62, 72, 74 among the compressor and turbine section 22, 32 are also referred to individually or collectively as a stator 63. As such, the stator 63 can refer to the combination of non-rotating elements throughout the engine 10.

In operation, the air flow exiting the fan section 18 is split such that a portion of the air flow is channeled into the LP compressor 24, which then supplies pressurized air 76 to the HP compressor 26, which further pressurizes the air. The pressurized air 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

A portion of the pressurized air flow 76 can be drawn from the compressor section 22 as bleed air 77. The bleed air 77 can be draw from the pressurized air flow 76 and provided to engine components requiring cooling. The temperature of pressurized air flow 76 entering the combustor 30 is significantly increased. As such, cooling provided by the bleed air 77 is necessary for operating of such engine components in the heightened temperature environments.

A remaining portion of the air flow 78 bypasses the LP compressor 24 and engine core 44 and exits the engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the air flow 78.

Some of the air supplied by the fan 20 can bypass the engine core 44 and be used for cooling of portions, especially hot portions, of the engine 10, and/or used to cool or power other aspects of the aircraft. In the context of a turbine engine, the hot portions of the engine are normally downstream of the combustor 30, especially the turbine section 32, with the HP turbine 34 being the hottest portion as it is directly downstream of the combustion section 28. Other sources of cooling fluid can be, but are not limited to, fluid discharged from the LP compressor 24 or the HP compressor 26.

Figure 2:
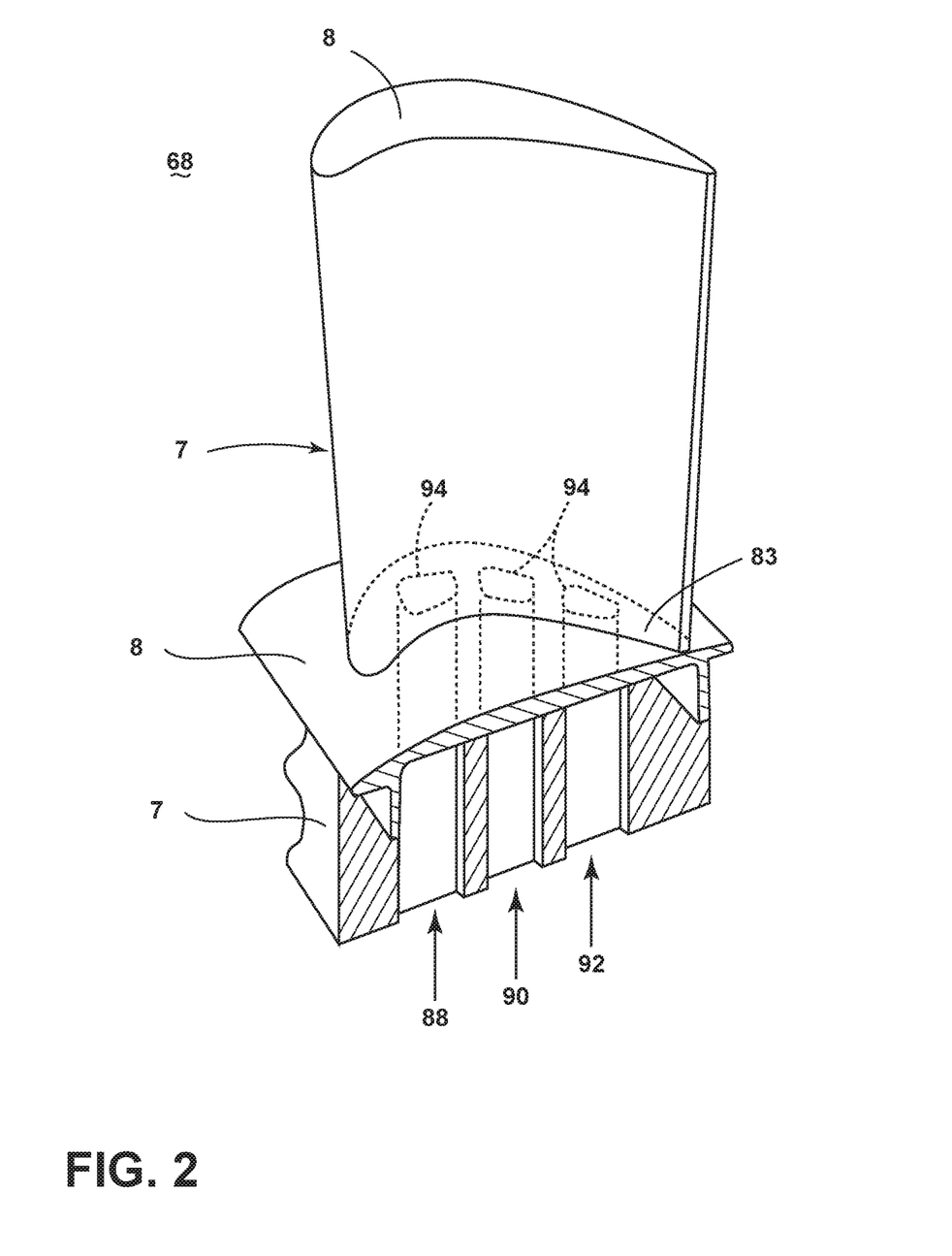
FIG. 2 is a perspective view of an engine component in the form of a turbine blade of the engine of FIG. 1 with cooling air inlet passages.

FIG. 2 is a perspective view of an engine component in the form of one of the turbine blades 68 of the engine 10 from FIG. 1. The turbine blade 68 includes a dovetail 75 and an airfoil 79. The airfoil 79 extends radially between a root 83 and a tip 81. The dovetail 75 further includes a platform 85 integral with the airfoil 79 at the root 83, which helps to radially contain the turbine air flow. The dovetail 75 can be configured to mount to a turbine rotor disk on the engine 10. The dovetail 75 comprises at least one inlet passage, exemplarily shown as a first inlet passage 88, a second inlet passage 90, and a third inlet passage 92, each extending through the dovetail 75 to provide internal fluid communication with the airfoil 79 at a passage outlet 94. The passage outlet 94 is fluidly coupled to multiple cooling circuits (FIG. 4), which can be at the root 83 as illustrated or at the tip 81, or at any other desired location. It should be appreciated that the dovetail 75 is shown in cross-section, such that the inlet passages 88, 90, 92 are housed within the body of the dovetail 75.

Figure 3:
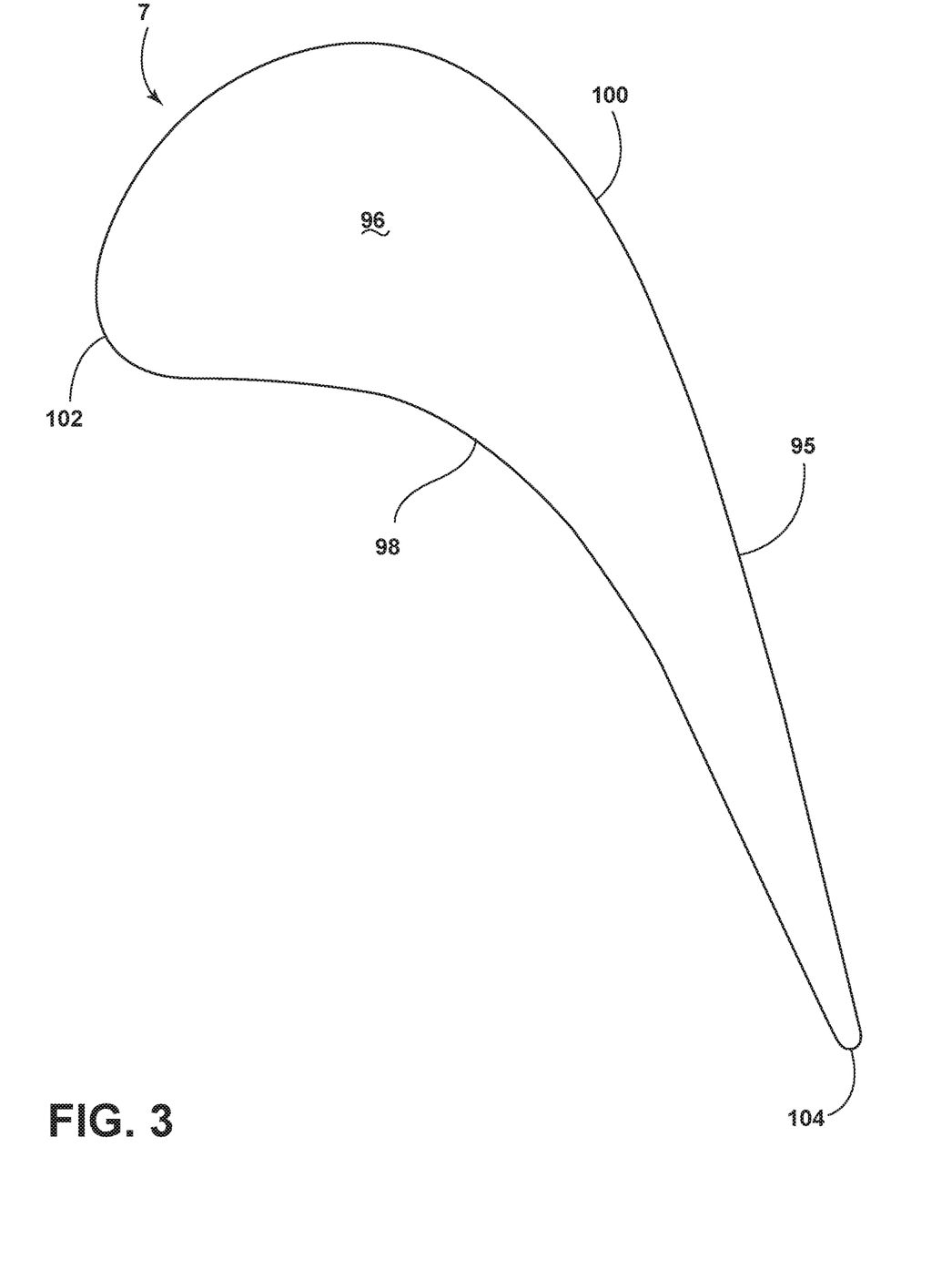
FIG. 3 is a schematic peripheral view of the airfoil of FIG. 2.

Turning to FIG. 3, the airfoil 79, shown in cross-section, comprises an outer wall 95 bounding an interior 96 having a concave-shaped pressure side 98 and a convex-shaped suction side 100 that are joined together to define an airfoil cross section extending axially between a leading edge 102 and a trailing edge 104. The blade 68 rotates in a direction such that the pressure side 98 follows the suction side 100. Thus, as shown in FIG. 3, the airfoil 79 would rotate upward toward the top of the page.

Figure 4:
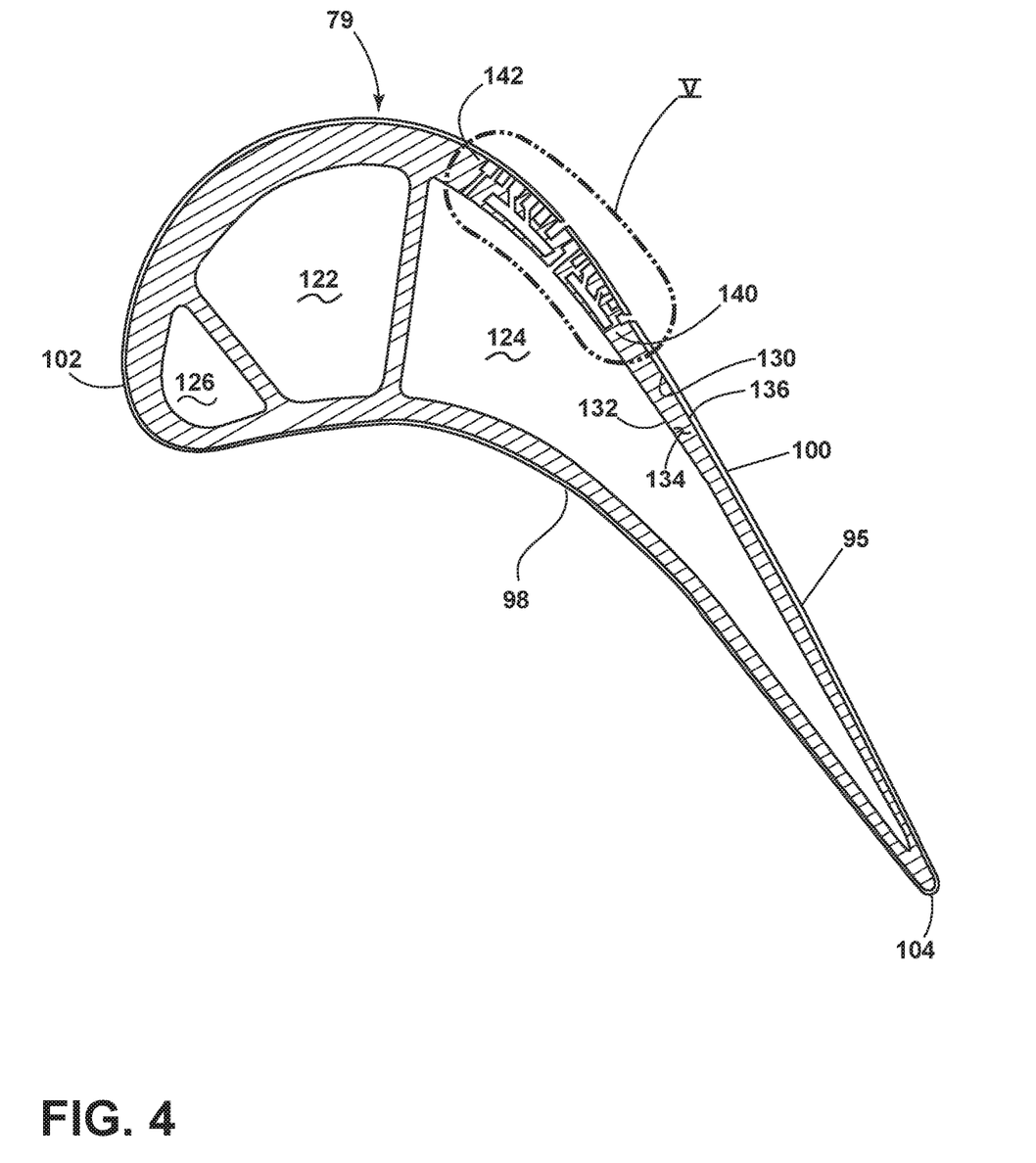
FIG. 4 is a cross sectional view of the airfoil of FIG. 2 and illustrating a plurality of internal passages.

Referring to FIG. 4, the interior 96 can be divided into a plurality of internal cooling air supply circuits 122, 124, 126 that can be arranged in any formation within the interior 96 and can extend from the root 83 to the tip 81. The cooling air supply circuits 122, 124, 126 are dedicated to providing cooling air to the interior 96. The cooling air supply circuits 122, 124, 126 are fluidly coupled to at least one of the inlet passages 88, 90, 92 where internal fluid communication is provided to at least one of the cooling air supply circuits 122, 124, 126 through the passage outlet 94.

It should be appreciated that the respective geometries of each individual cooling air supply circuit 122, 124, 126 within the airfoil 79 as shown are exemplary, and not meant to limit the airfoil 79 to the number of cooling air supply circuits, their geometries, dimensions, or positions as shown. Additionally the cooling air supply circuits 122, 124, 126 can be fluidly coupled to each other to provide additional internal fluid communication between adjacent cooling air supply circuits. Further, while three cooling air supply circuits are shown, there can be any number of cooling air supply circuits from one to multiple, for example.

The outer wall 95 comprises an outer surface 130 and an inner surface 132 together defining an interior space 134 that is generally solid. At least one coating 136 is applied to the outer surface 130 where the coating 136 can include one or more layers comprising metallic, ceramic, or any other suitable material. The outer surface 130 and the at least one coating 136 define a "skin" for the airfoil. The outer wall 95, including the skin, separates a hot air flow H on a first surface 128 of the airfoil from a cooling fluid flow C along a second surface 129 and supplied to the cooling air circuits 122, 124, 126. The coating 136 can be formed by various known methods such as spray, vapor deposition, and so forth, and also by additive manufacturing.

A plurality of film holes 138 can be fluidly coupled to at least one of the cooling air supply circuits 122, 124, 126 to provide cooling air onto the exterior of the airfoil 79. It should be understood that film holes 138 can be film cooling exits of any geometry, such as but not limited to holes, shaped holes, and slots.

At least one wall cooling passage 140 and one skin cooling circuit 142 are provided with the airfoil 79. The plurality of film holes 138 can be fluidly coupled to one of or all of the wall cooling passages 140 or skin cooling circuits 142. The at least one cooling supply circuit 124, skin cooling circuit 142, and wall cooling passage 140 are fluidly coupled to each other and together define a serial flow path from the supply circuit 124 to the exterior of the airfoil 79. It should be understood that while illustrated adjacent the cooling air supply circuit 124, the at least one skin cooling circuit 142 and wall cooling passage 140 can be provided at any location within the interior space 134 of the outer wall 95 of the airfoil 79.

Figure 5:
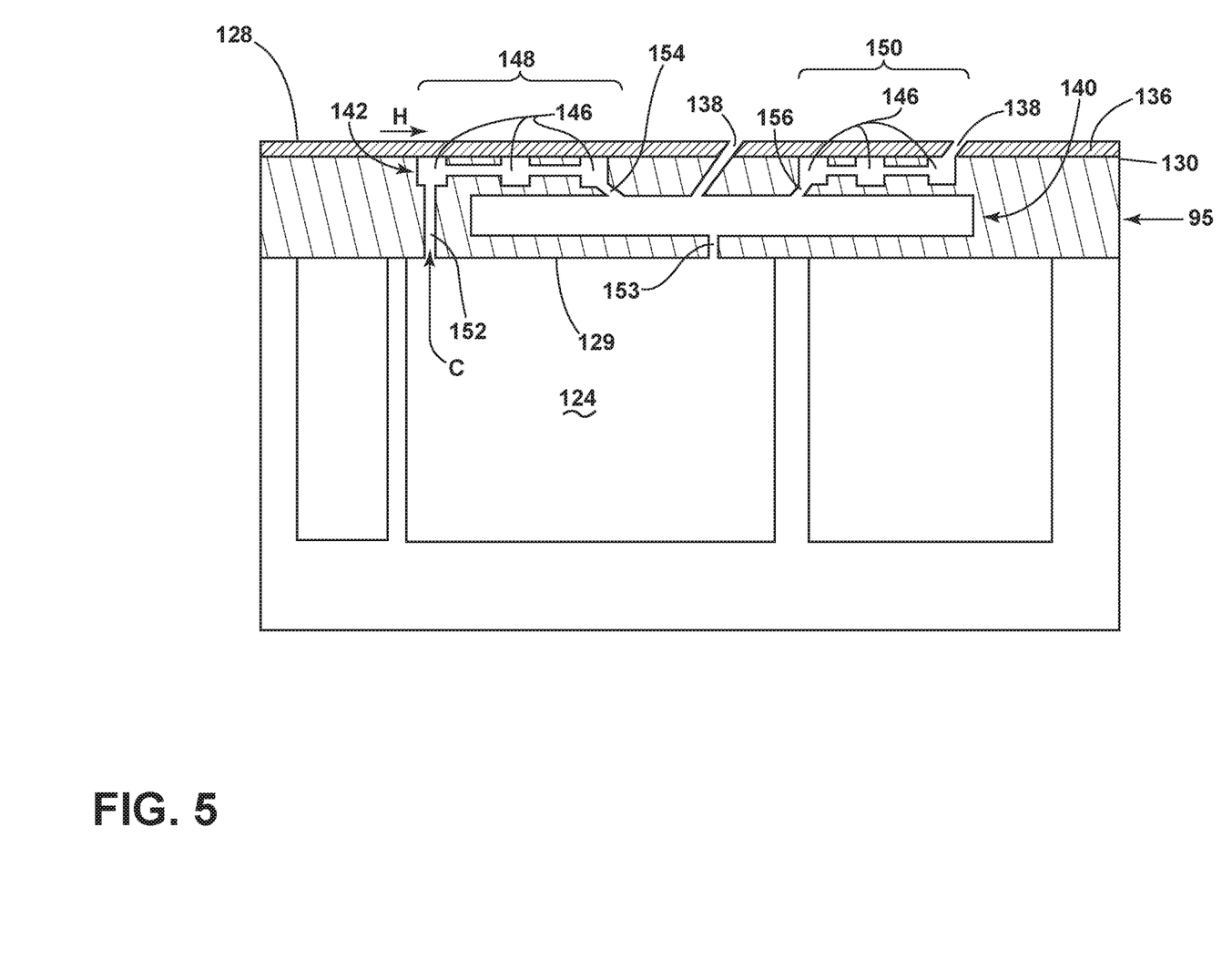
FIG. 5 is a schematic representation of a call out portion of the airfoil of FIG. 4 illustrating a wall cooling passage, a skin cooling circuit, and an air cooling air supply circuit.

Referring to FIG. 5, the details of the wall cooling passage 140 and the skin cooling circuit 142 will be described with respect to this schematic representation of a portion of the airfoil FIG. 4. The skin cooling circuit 142 comprises at least one channel 146 provided in the outer surface 130 and at least one film hole 138 passing through the coating 136 to the channel 146. The skin cooling circuit 142 can be formed in the outer surface 130 or in the coating 136 or formed in a combination of both as illustrated. In some embodiments, a portion of the coating 136 shown could be part of the same substrate that forms the channels 146, and then a coating cab be added on top, enclosing the skin cooling circuit 142 with a non-coating material for example with a metal plate that is brazed on or attached to the outer surface. It should be understood that the multiple channels and passages shown are exemplary and not meant to be limiting for example in shape, orientation, or size.

The at least one channel 146 can be multiple channels 146, which are fluidly coupled to each other or fluidly separate from each other. The multiple channels 146 may be arranged in groups 148, 150, which can be used to form sub-circuits within the skin cooling circuit 142. The multiple channels 146 can vary in width and length. A wall cooling hole 152 can provide a fluid connection between the first group 148 of multiple channels 146 and the cooling air supply circuit 124. It is further contemplated that multiple film holes 138 can pass through the coating to only one of the multiple channels 146 or to several or all of the multiple channels 146.

The wall cooling passage 140 comprises one or more wall cooling passages 140 provided within the interior space 134 of the wall 95 and bounded by the inner and outer surfaces 130, 132. The wall cooling passage 140 can include at least one wall cooling hole 153 fluidly coupling the wall cooling passage 140 to the supply circuit 124. It can be contemplated that the channels 146 can be of the same or less dimensions as the wall cooling passages 140, and in further embodiments are 50% or less of the wall cooling passages 140.

It is further contemplated that multiple holes 154 can be formed as apertures or slots passing through the interior space 134 from the first group 148 of multiple channels 146 to an upstream portion of the wall cooling passage 140. Additional multiple holes 156 can provide fluid communication between the wall cooling passage 140 and the second group 150 of multiple channels 146 at a downstream portion of the wall cooling passage 140.

Figure 6A:
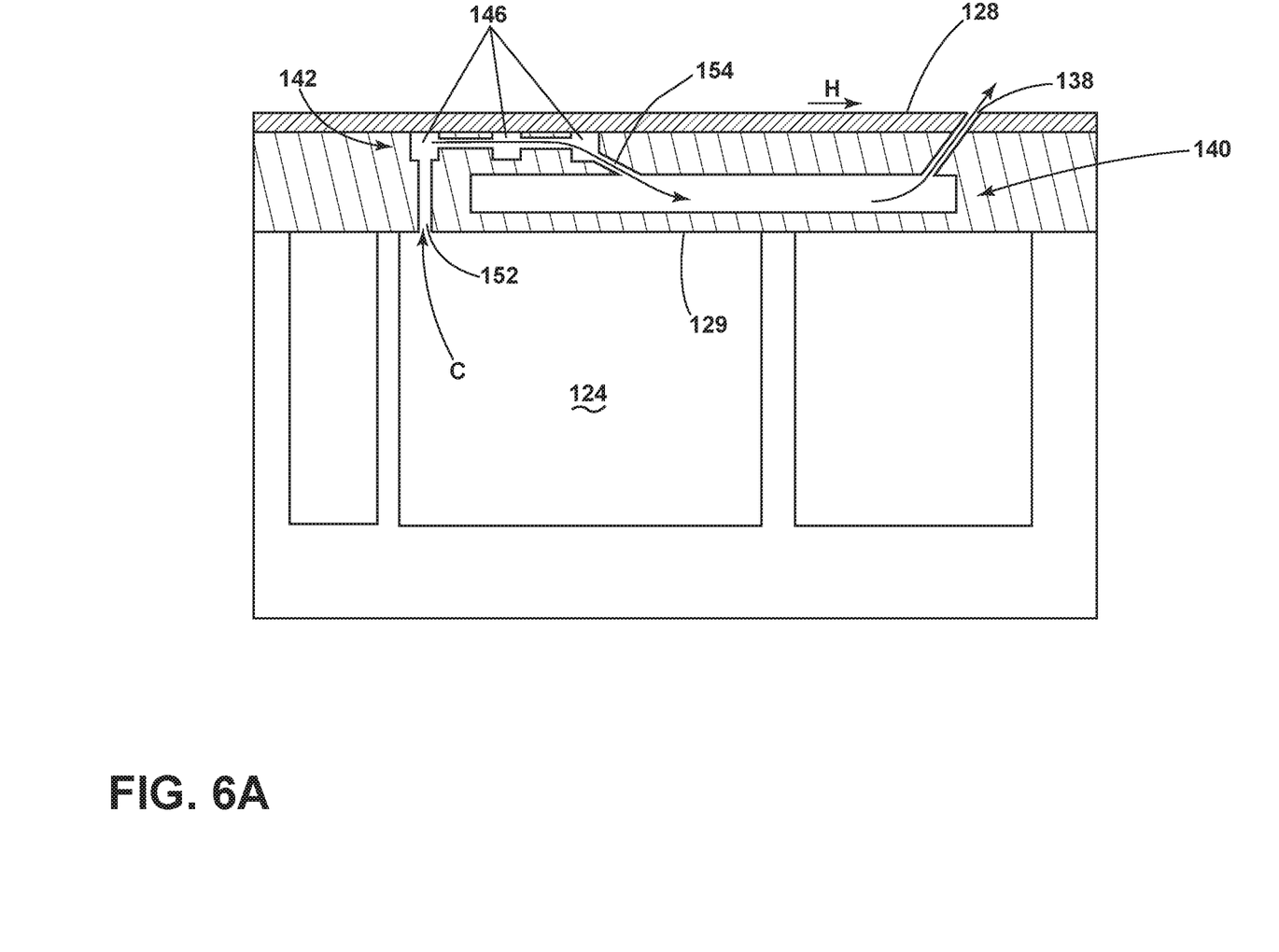
FIGS. 6A and 6B are schematic representations of different flow directions for the wall cooling passage and skin cooling circuit of FIG. 5.
Figure 6B:
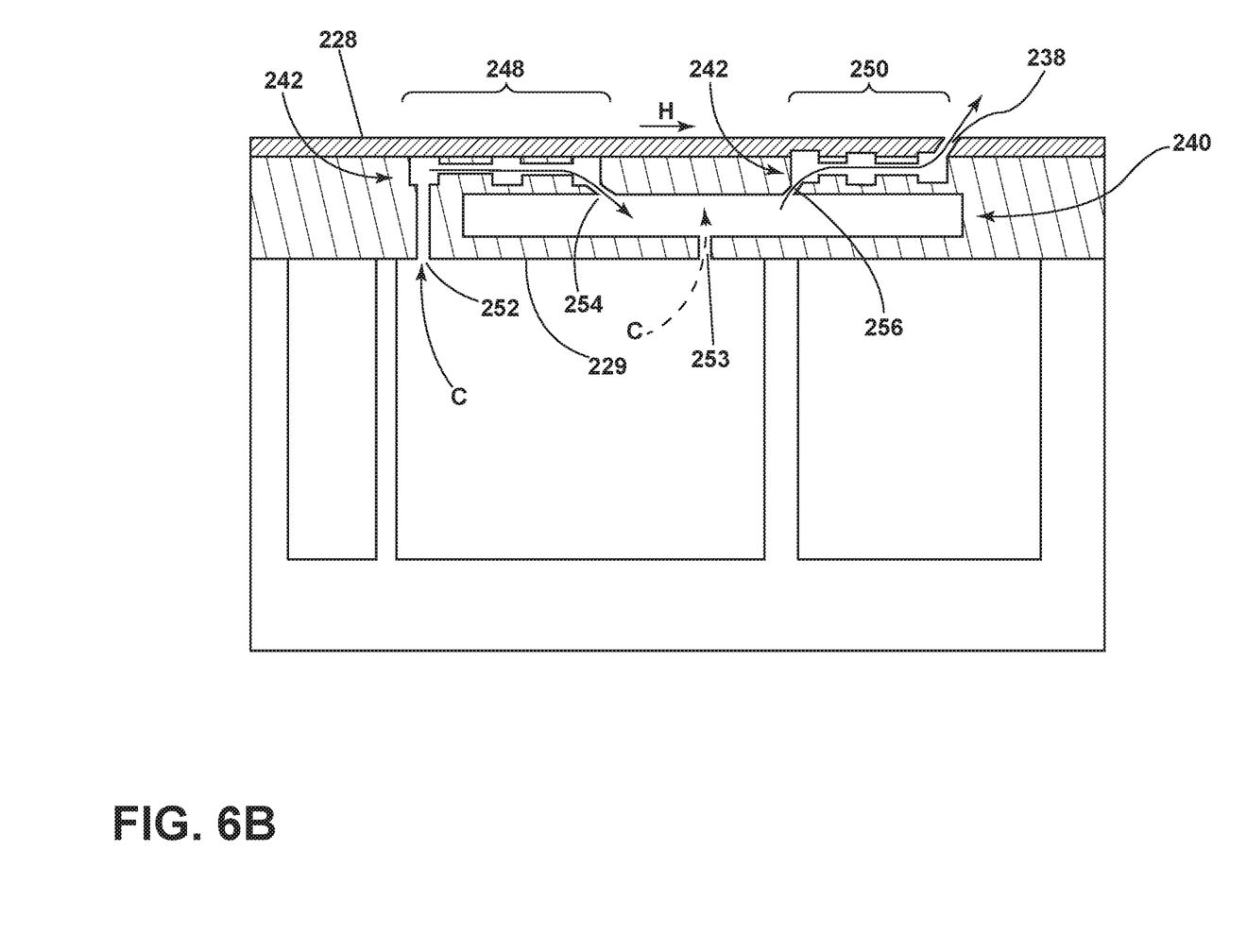

Turning now to FIGS. 6A and 6B, a cooling fluid flow C comprising cooling air is supplied to the cooling air supply circuit 124 through the passage outlet 94 coupled to, for example, one of the first, second, or third inlet passages 88, 90, 92. These configurations are similar to each other, therefore, like parts will be identified with like numerals increasing by 100, with it being understood that the description of the like parts of each configuration applies to the additional configurations, unless otherwise noted.

In FIG. 6A, the cooling air flows first from the cooling air supply circuit 124 through the wall cooling hole 152 to the skin cooling circuit 142 where it is then directed into the wall cooling passage 140 before exiting through one the plurality of film holes 138 fluidly coupled to the wall cooling passage 140.

In FIG. 6B cooling air is provided to the first group 248 of multiple channels 146 and again directed into the wall cooling passage 240 after which cooling air passes through the second group 250 of multiple channels 246 before exiting through at least one of the plurality of film holes 238 fluidly coupled to the second group 250.

Additionally, cooling air can also be directly provided from one of the cooling air supply circuits 224 to one or some of the wall cooling passages 240 as illustrated by the dashed line in FIG. 6B.

While FIGS. 6A and 6B illustrate two configurations for supplying cooling air to the skin cooling circuits 142 and wall cooling passages 140, it should be understood that the configurations depicted are for illustrative purposes only and not meant to be limiting and that other configurations can be contemplated.

A method of cooling the airfoil 79 comprises passing the cooling airflow C from a hollow interior 96 of the airfoil 79 to a channel 146 in the outer surface 130 of the outer wall 95, and then from the channel 146 to a passage 140 within the outer wall 95. The method of cooling the airfoil by passing cooling airflow along the serial flow path from the supply circuit 124 to at least one channel 146 and then to the wall cooling passage 140 includes passing cooling airflow C through a number of wall cooling and film cooling holes 138, 152, 153, 154 wherein at least some of the holes 138, 152, 153, 154 can pass through the coating 136. The method can also include passing the cooling airflow C from the wall cooling passage 140 to another channel 146, illustrated within the second group 150, and then through the coating 136 overlying the outer surface 130.

It can be contemplated that an entire engine component with multiple wall passages and skin cooling circuits can be cast as a single piece after which molding and reforming portions of the engine component can be implemented and then a coating applied. Additive manufacturing where a main component such as the cooling air supply circuit is cast and the additional components including the wall passages, fluidly connecting holes, and skin cooling circuits are added can also be contemplated.

The disclosure herein consists of cooled components that utilize both wall cooling passages and skin cooling circuits through which cooling air flows in parallel and in series and in which the wall cooling passages receive cooling air from an air supply circuit at the root or tip of the airfoil.

The disclosure includes skin cooling circuits that return cooling fluid to wall cooling passages for interior heat exchange before releasing the cooling fluid flow C as film cooling.

Skin cooling circuits alone can allow up to 30% cooling flow reduction. Benefits to utilizing wall cooling passages in parallel with skin cooling circuits include increasing thermal uniformity of the substrate structure. In the event that the more at risk skin cooling circuit fails, the parallel wall cooling passage can still provide thermal and structural integrity to the engine component.

In newer generation turbine cooling 30 to 50% less flow is utilized as compared to prior turbine cooling. Combining the wall cooling passage with skin cooling circuits enables 30% cooling flow reduction, decreases cost, and decreases specific fuel consumption.

This written description uses examples to disclose the invention, including the best mode, and to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An airfoil for a turbine engine, the airfoil comprising:
an outer wall having an outer surface and an inner surface bounding an interior space, the outer wall defining a pressure side and a suction side extending axially between a leading edge and a trailing edge and extending radially between a root and a tip;
at least one coating applied to the outer surface;
at least one wall cooling passage provided within at least a portion of an interior of the outer wall;
at least one skin cooling circuit comprising multiple channels arranged in groups, with a first of the groups fluidly coupled upstream to the at least one wall cooling passage to supply the at least one wall cooling passage, and a second of the groups fluidly coupled downstream of the wall cooling passage to be supplied from the wall cooling passage located between the coating and the at least one wall cooling passage formed in the outer surface and fluidly coupled to the wall cooling passage; and
at least one cooling air supply circuit located within the interior and fluidly coupled to at least one channel of the multiple channels to define a serial air flow path from the supply circuit to the at least one channel and then to the wall cooling passage;
wherein at least one hole passes through the coating to the second of the groups.

2. The airfoil of claim 1 further comprising at least one hole passing through the coating to the at least one wall cooling passage.

3. The airfoil of claim 1 wherein at least one of the multiple channels is fluidly coupled to the wall cooling passage.

4. The airfoil of claim 1 further comprising multiple holes passing through the coating for each of the multiple channels.

5. The airfoil of claim 1 further comprising multiple holes passing through the coating to the wall cooling passage.

6. The airfoil of claim 1 further comprising multiple holes passing through the outer wall to fluidly couple the supply circuit to the at least one channel.

7. An engine component for a turbine engine, which generates a hot air flow, and provides a cooling fluid flow, comprising:
a wall separating the hot air flow from the cooling fluid flow and having a first surface along which the hot air flows in a hot flow path and a second surface facing the cooling fluid flow;
at least one coating applied to the first surface;
at least one wall cooling passage provided within at least a portion of an interior of the wall; and
at least one skin cooling circuit comprising multiple channels arranged in groups, with a first of the groups fluidly coupled upstream to the at least one wall cooling passage to supply the at least one wall cooling passage, and a second of the groups fluidly coupled downstream of the wall cooling passage to be supplied from the wall cooling passage located between the coating and the at least one wall cooling passage formed in the first surface and fluidly coupled to the wall cooling passage;
wherein the cooling fluid flow is fluidly coupled to at least one channel of the multiple channels, which is fluidly coupled to the wall cooling passage to define a serial cooling air flow path in a direction from the at least one channel to the wall cooling passage, and
wherein at least one hole passes through the coating to the second of the groups.

8. The engine component of claim 7 further comprising at least one hole passing through the coating to the at least one wall cooling passage or channel.

9. The engine component of claim 7 wherein at least one of the multiple channels is fluidly coupled to the wall cooling passage.

10. The engine component of claim 7 further comprising multiple holes passing through the coating for each of the multiple channels.

11. The engine component of claim 7 further comprising multiple holes passing through the coating to the wall cooling passage.

12. The engine component of claim 7 further comprising multiple holes passing through the wall to fluidly couple the cooling fluid flow to the at least one channel.

13. A method of cooling an airfoil having an outer wall defining an outer surface with at least one coating applied to the outer surface, the method comprising passing a cooling airflow from a hollow interior of the airfoil to a channel formed in the outer surface and located between the outer surface and a wall cooling passage located within the outer wall, and then passing the cooling airflow from the channel to the wall cooling passage within the outer wall and passing the cooling airflow from the passage through a hole in the coating overlying the outer surface.

14. The method of claim 13 further comprising passing the cooling airflow from the passage to another channel formed in the outer surface.

15. The method of claim 14 further comprising passing the cooling airflow from the another channel through a hole in the coating overlying the outer surface.

* * * * *